United States Patent

[11] 3,632,181

[72] Inventor Jerald D. Lee
 Wilmington, Del.
[21] Appl. No. 19,024
[22] Filed Mar. 12, 1970
[45] Patented Jan. 4, 1972
[73] Assignee Holotron Corporation
 Wilmington, Del.

[54] TWO-DIMENSIONAL HOLOGRAPHIC IMAGE PROJECTION SYSTEMS
9 Claims, 10 Drawing Figs.

[52] U.S. Cl. .................................................. 350/3.5, 350/9
[51] Int. Cl. .................................................. G02b 27/00
[50] Field of Search ........................................ 350/3.5, 9; 352/85; 343/6, 17; 35/12 N

[56] References Cited
UNITED STATES PATENTS
3,435,452  3/1969  Kilpatrick ................ 350/3.5 X
3,530,780  9/1970  Haynes ................... 350/3.5 X
3,533,676  10/1970  Lin ....................... 350/3.5

OTHER REFERENCES
Leith et al., Physics Today, Aug. 1965 pp. 26–30
Reid, High Speed Photography, Proc. of the 8th Internation Congress, Stockholm, June 1968, pp. 314–316

Primary Examiner—David Schonberg
Assistant Examiner—Ronald J. Stern
Attorney—Woodcock, Washburn, Kurtz & Machiewicz ABSTRACT: A system for projecting an image onto a two-dimensional screen from a Fresnel-type off-axis hologram constructed of a three-dimensional object. The hologram is illuminated with at least one narrow beam of reconstructing light having an area significantly smaller than that of the hologram. As the beam of reconstructing light is moved relative to the hologram, the two-dimensional image presents a changing view of the three-dimensional object. If two narrow parallel reconstructing beams illuminate the hologram, two images of the three-dimensional object are formed in a stereoscopic effect, the two images being separated from each other by distinct polarization of the two hologram reconstructing beams or by a provision of separate exit pupils. A plurality of holograms may be so reconstructed in succession to form an apparently continuously changing view of the object and has application to simulated motion relative to the object, such as that of an aircraft approaching a runway as an object.

PATENTED JAN 4 1972  3,632,181

TWO-DIMENSIONAL HOLOGRAPHIC IMAGE PROJECTION SYSTEMS

BACKGROUND OF THE INVENTION

This invention relates generally to the art of holography and more specifically to the use of an off-axis hologram for reconstructing two-dimensional images of a three-dimensional object in various views thereof.

The basic techniques of off-axis holography as developed by Leith and Upatnieks are now well known with various treatments thereof found in the literature. A fundamental discussion of the off-axis holographic technique is given by Leith and Upatnieks in the *Scientific American*, June 1965, pages 24–35. Briefly described, this technique contemplates illuminating an object with coherent light to form an object-modified beam. A photosensitive hologram detector, such as high-resolution photographic film, is positioned to intercept the object-illuminating beam also strikes the hologram detector in a direction to form a finite angle with the object-modified beam. After any necessary processing of the detector is accomplished, a Fresnel hologram results from which a three-dimensional image of the object may be reconstructed. For image reconstruction, the hologram is illuminated by a reconstructing light beam in a manner related to the illumination of the detector by the reference beam during the hologram construction. Part of the reconstructing light beam intensity is diffracted by the hologram and it is this diffracted beam in which a light detector, such as a human eye, may be positioned to view an image of the object. The light detector may be moved around within this beam to change the object image view obtained in the same manner as if the object itself were being observed. To a certain extent, the viewer may "walk around" the object image and obtain various views thereof.

It is a primary object of this invention to provide a technique for reconstructing such a hologram in a manner to project onto a two-dimensional screen an image of an object as it would be viewed from a predetermined position relative to the object.

It is also an object of this invention to provide a technique for projecting onto a screen a succession of two-dimensional images of an object that is adaptable to motion simulation.

It is a further object of this invention to provide a technique for projecting onto a screen from a hologram two-dimensional images of an object in a manner to be stereoscopically viewable.

SUMMARY OF THE INVENTION

These and additional objects are accomplished by the present invention which utilizes the characteristics of a Fresnel-type hologram that the entire object scene recorded thereon may be reconstructed by illumination of a portion thereof significantly less in area than that of the entire hologram. A hologram constructed of an object has an image reconstructed therefrom by illumination with a narrow beam of reconstructing radiation in an area thereof that is significantly less than the total hologram area. An appropriate lens is placed within the light beam diffracted by the hologram to project an image into real image space and onto a diffusion screen for viewing. This lens may also be chosen to magnify the image to be larger than the object originally recorded on the hologram. The diffusion screen may be reflective or transmittive. Another lens may also be provided in the diffracted beam to limit the size of an exit viewing pupil and thus conserve radiation power. As the small area of the hologram illuminated by the reconstructing radiation beam is changed, so will be the image projected onto the screen, not in the object observed but in the apparent position from which the object is viewed.

The object initially recorded or the hologram may be, for example, a dress, automobile or some other large saleable object or a scaled replica thereof. The hologram contains enough information of the object so that when it is read out according to the techniques of the present invention, various views of the object may be had in succession of two-dimensional images obtained by illuminating various portions of the hologram. Such a hologram and the reconstructing apparatus is much easier to transport to potential customers than the actual object.

The narrow reconstructing radiation beam is moved with respect to the hologram while maintaining a constant angle therewith. This relative motion may be obtained either by moving the hologram relative to the reconstructing radiation beam or by moving the radiation beam over a stationary hologram. The reconstructing radiation beam is moved over the hologram, by a preferred technique, in response to movement of a mirror supported on a gimbal ring. The gimbal ring allows rotation of the mirror about two orthogonal axes passing therethrough and crossing at a point of its reflective surface which is, therefore, the mirror's center of rotation. A reconstructing light beam is brought to a point focus on the mirror at its center of rotation and reflected into a lens having a focal point coincident with the mirror's point of rotation. The light emerges from the lens as a collimated beam with a position in space that is determined by the position of the mirror about its axes of rotation. The collimated beam is substantially parallel with itself at all useable positions of the mirror.

In any particular application wherein an image is projected onto a diffusion screen from a hologram, it may be desired to provide a stereoscopic effect; that is to form one or more images on a two-dimensional screen to give the appearance of three-dimensionality. This is accomplished, according to this invention, by reconstructing a pair of images from the hologram and simultaneously projecting both images onto a diffusion screen. This pair of images is reconstructed by illuminating the hologram with two narrow beams of reconstructing radiation which remain parallel to each other and separated upon intersection of the hologram by a distance related to eye separation of the observer. To provide a stereoscopic effect, one of the projected images must be limited to observation only by one eye and the other image limited to observation only by the other eye of the viewer. This may be accomplished in either of two ways: First, the pair of reconstructing radiation beams may be given polarization distinct from one another and the viewer provided with polarized glasses. Alternatively, since the viewer will often not be moving about a great deal relative to the diffusion screen, separate exit pupils may be provided for each eye by the use of a large lens coextensive with the diffusion screen.

The techniques of the present invention described herein may be adapted for application to motion simulation. A large number of holograms are constructed of a surrounding (either an actual surrounding or a scaled model thereof) along a projected path of motion of a boat, automobile, airplane, etc. The viewer of the holographically reconstructed images of the surroundings positions himself in front of a diffusion screen in a simulator and controls his apparent speed and position relative to these surroundings by appropriate control of the hologram reconstructing apparatus. To control the simulated speed of the vehicle, the rate at which the individual holograms are reconstructed is either increased or decreased. To simulate changes in lateral position within the surroundings, that part of the hologram illuminated by a narrow reconstructing radiation beam is changed. These variables may be controllable in a simulating apparatus by ordinary vehicular controls for driver or pilot training. A specific application of this technique illustrated hereinafter in more detail is a simulation of landing an aircraft wherein a sequence of holograms is constructed of an airport model along a defined glide path approaching the airport. An image of the surroundings is then reconstructed and controlled in a manner to bring about an apparent change of position of the aircraft relative thereto.

A more complete description of the present invention in its various forms may be had by reference to the following detailed description of its preferred embodiments taken in conjunction with the accompanying drawings.

DESCRIPTION OF THE PREFERRED EMBODIMENT

Figure 1:
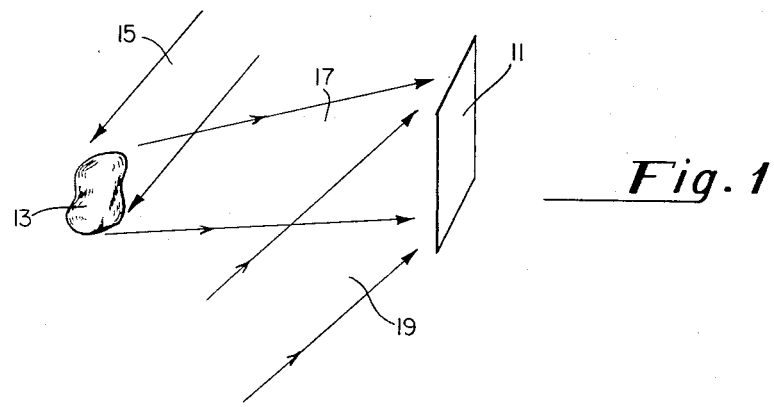
FIG. 1 is a known method of constructing a Fresnel off-axis hologram of an object.

Referring to FIG. 1, a photosensitive hologram detector 11 is exposed in a known manner to produce a Fresnel hologram of an object 13. The object 13 is illuminated with coherent light, preferably from a laser source. The object reflects and diffracts this light to form an object-modified beam 17 which strikes the photosensitive detector 11. A reference beam 19, coherent with the object-illuminating beam 15 and generally derived from the same laser source by conventional optics, also strikes the detector 11 at a finite angle with the object-bearing beam 17. After developing the photosensitive detector 11 as the nature of the detector so requires, a hologram 11' results from which a three-dimensional image of the object 13 may be reconstructed by reilluminating the hologram with the reference beam 19.

Figure 2:
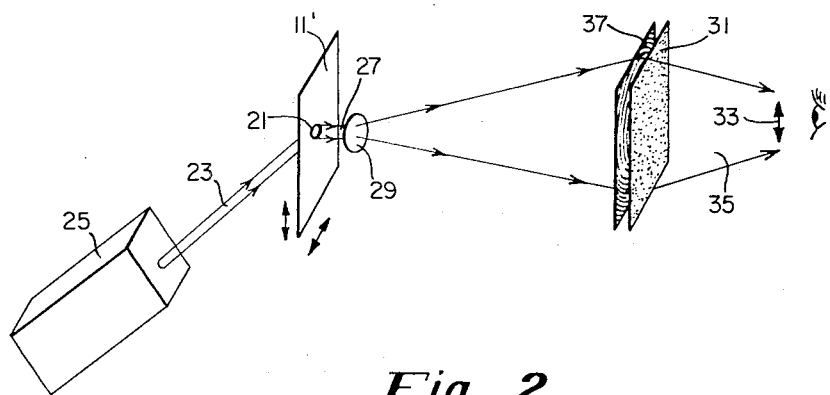
FIG. 2 illustrates the present invention in one embodiment in reconstructing a hologram constructed according to FIG. 1.

The alternate hologram illumination techniques provided by the present invention are illustrated in one form in FIG. 2. The complete hologram 11' is illuminated in an area 21 thereof by a narrow reconstructing light beam 23 derived from a laser source 25. A portion of the intensity of the reconstructing light beam 23 is diffracted by the area 21 of the hologram 11' to form an object-image-carrying diffracted beam 27 which is projected by a lens 29 onto a transmissive diffusion screen 31 to form a two-dimensional real space image of the object 13 thereon. This two-dimensional image will provide a view of the object 13 as if the object itself were being viewed from a single position. If the observer moves his head relative to the screen 31 and the image displayed thereon, no change in perspective will be brought about as it is in ordinary holography. A change of perspective is brought about, however, by movement of the hologram 11' relative to the reconstructing beam 23 so that a different area thereof is illuminated. In this way, an infinite number of particular views of the object 13 may be obtained, in those situations where a two-dimensional screen display must be provided for some reason. The use of a hologram, even though a three-dimensional image is desired, has the advantage of allowing this wide range of two-dimensional object image views to be selectively obtained.

The angle that the reconstructing radiation beam 23 makes with the hologram 11' of FIG. 2 must remain constant in order to avoid distortions in the various reconstructed two-dimensional images formed from distinct small areas of the hologram 11'. In the configuration of FIG. 2, it is indicated that the hologram is drawn through the reconstructing beam 23. This movement, therefore, is restricted to a single plane. The reconstructing beam 23 is most conveniently obtained directly from the narrow collimated light beam output of a typical laser 25, but need not be restricted to a collimated beam. However, if the photosensitive layer of the hologram detector 11 is thick enough, the curvature of the reconstructing beam 23 should be substantially identical to that of the reference beam 19 used in constructing a hologram in order to satisfy the Bragg condition and thus utilize laser power most efficiently. So that the small, convenient collimated light beam 23 may be used in reconstructing the hologram, the hologram is shown to be constructed in FIG. 1 with a collimated reference beam 19 but it should be understood that the invention is in no way restricted to the use of collimated radiation.

According to known techniques, either a virtual or real space image may be formed by illuminating the hologram in a particular manner with the reconstructing light beam 23. The diffracted beam 27 of FIG. 2 is considered to reconstruct therein a virtual image of the object. Therefore, the lens 29 is a positive one designed to transfer this virtual image from behind the hologram 11' into real space coincident with the diffusing screen 31. The lens 29 may also be designed to produce a magnified image larger than the original object. Alternatively, if a real space is projected directly from the hologram 11', the lens 29 may be omitted. For magnification of a real space image reconstructed directly from the hologram, a negative lens is positioned in the hologram diffracted light beam.

A diffusion screen 31 as shown in FIG. 2 on which an image of the object 13 is displayed by its nature scatters light. It is desirable that the maximum angle through which light is scattered by the diffusion screen 31 be limited to form an area 33 in the nature of an exit pupil. The area 33 is a region from any point of which an observer may view the entire image on the screen. The area 33 is preferably small to conserve laser output power which is usually limited. In many applications of the techniques of this invention, the observer will remain substantially stationary relative to the diffusion screen 31. Therefore, an object image information carrying beam 35 emerging from the diffusion screen 31 need only be, at a plane wherein the viewer is to position his eyes, slightly larger in cross section than necessary to cover the observer's eyes. That is the preferred dimension of the area 33. Therefore, the diffusion screen 31 is designed to scatter light over only a narrow range of angles. As an additional aid in limiting the size of the area 33, a lens 37 may be provided adjacent the diffusion screen 31 to coverage the light striking the screen into the smaller exit pupil 33. The lens 37 is most conveniently a flat plastic Fresnel lens.

Figure 3:
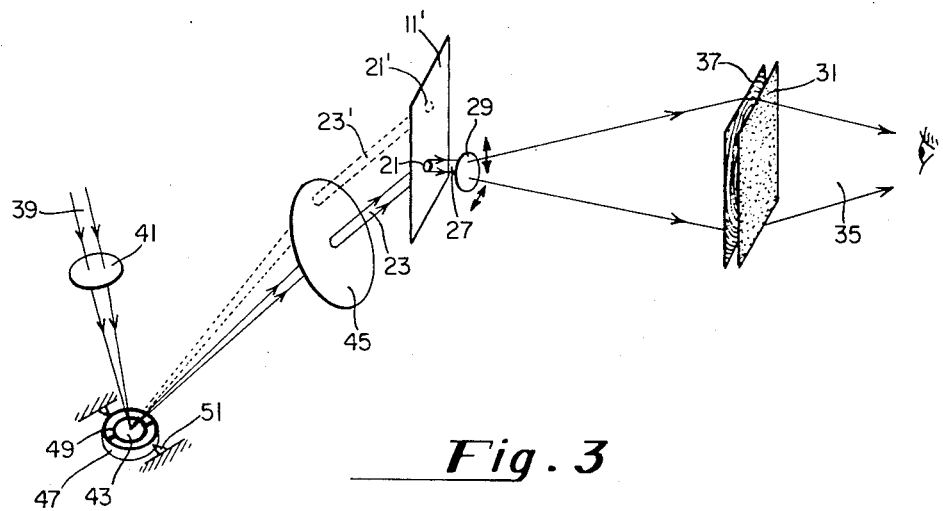
FIG. 3 shows another embodiment of the hologram-reconstructing process according to the present invention.

Referring to FIG. 3, a modification is provided in the hologram-reconstructing technique illustrated of FIG. 2. To vary the hologram area illuminated by the reconstructing beam 23, the hologram is not moved through the beam path, as hereinbefore, but the required relative motion is obtained in the modification of FIG. 3 by moving the beam 23 over the hologram 11' at a constant angle relative thereto, thereby obtaining the desired views of the object. A narrow beam of light 39 is obtained directly from a conventional laser and is brought to a point focus by a lens 41. A mirror 43 is mounted in a manner to be rotatable about two orthogonal axes that cross at a point on the reflective surface. The lens 41 is positioned relative to a mirror mechanism so that its point focus is coincident with the point of crossing of the mirror's axes of rotation (center of rotation of the mirror). A second lens 45 is provided with a focal point that is coincident with the mirror's center of rotation. Therefore, as the mirror 43 is rotated about either of its orthogonal axes, the collimated reconstructing beam 23 emerges from the lens 45 at a position dependent upon the position of the mirror 43 but always parallel with itself. For instance, the mirror 43 may be rotatably positioned to produce a reconstructing beam 23', which illuminates an area 21' of the hologram 11'. As the reconstructing beam 23 is scanned, the projecting lens 23 is moved relative to the hologram 11' so that it is always within the diffracted light beam.

The mirror 43 may be given the required rotation by attachment to a gimbal ring 47. A second ring 49 is provided to surround the mirror 43 and be rigidly attached thereto. The second ring 49 is pivotally mounted to the gimbal ring 47 to allow rotation of the mirror 43 about one of its axes. The gimbal ring 47 is in turn pivotally mounted on supports 51 on opposite sides thereof to form the other axis of rotation of the mirror 43.

An application of the hologram reconstruction techniques described with respect to FIGS. 2 and 3 is to simulate motion of the viewer relative the reconstructed object image. A simulation example described herein is that of an aircraft approaching a runway for a landing. It is desired to provide a moving picture in a ground simulating apparatus that is substantially identical to the picture that the pilot actually obtains while landing a plane at a given airport. It has long been the practice to use ordinary photographic movie techniques in such ground simulators but holography offers certain advantages. A primary advantage is the continuous change in viewing perspectives made possible in directions lateral to the designed glide path.

Figure 4:
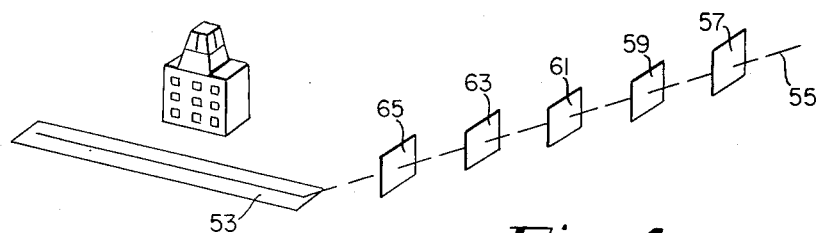
FIG. 4 illustrates a technique for constructing successive holograms along a predetermined path of motion to be simulated.
Figure 5:
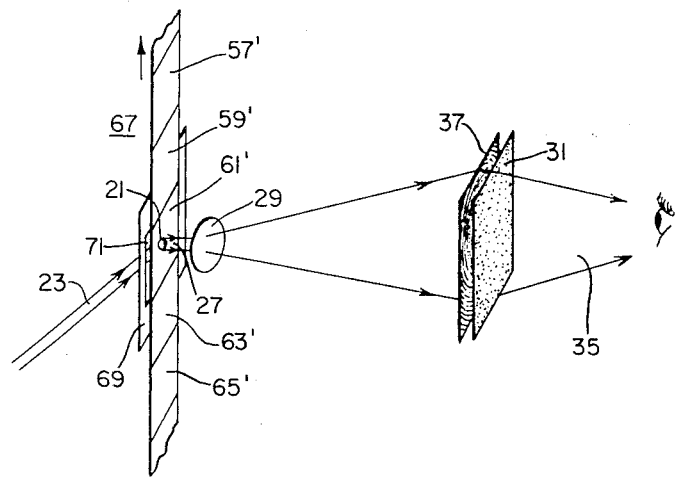
FIG. 5 shows a technique for reconstructing a succession of holograms constructed according to the technique of FIG. 4.

Referring to FIG. 4, consider a runway model 53 reduced in scale from an actual runway so that a series of holograms may be made thereof using a laser of available power for its illumination. The model should include various buildings, towers and even mountains which become important to a pilot in landing his aircraft. A glide path replica 55 is established for the model. A series of individual holograms are made in succession at periodic intervals along the glide path replica 55. Consider the hologram apertures 57, 59, 61, 63, and 65, all surfaces perpendicular with the glide path 55. Holograms made at these locations are most conveniently joined in a film strip 67 for successive readout, as shown in FIG. 5. A distinct hologram should be constructed every several hundredths of an inch along the glide path 55 of an airport model reduced in size by a factor of several thousand.

Referring to FIG. 5, the hologram reconstruction techniques of FIGS. 2 and 3 are adapted for reconstruction of the film strip 67. A mask 69 having an aperture 71 that is equal to the area of each of the holograms recorded on the film strip 67 is provided in the illustration of FIG. 5 to make clear how successive images are reconstructed from the film strip 67. However, as will become apparent hereinafter, the mask 69 is really unnecessary in a practical apparatus. A single hologram 61' is illuminated with the reconstructing light beam 23 when it is in position in front of the aperture 71. The reconstructing radiation beam 23 illuminates the hologram 61' for only a short duration, and can be accomplished by a continuous wave laser with a shutter but preferably is accomplished with a pulsed laser. An image is shown on the screen 31, therefore, only for the short time that the reconstructing light beam operates. The reconstructing beam 23 is made a small diameter to improve the depth of field of the reconstructed image. However, the diameter of the reconstructing beam 23 must be large enough that resolution over the entire image is not excessively degraded by diffraction.

After such illumination of the hologram 61', the film strip 67 is drawn to position the hologram 63' in front of the aperture 71 and the reconstructing beam 23 again instantaneously illuminates an area of the hologram 63'. The movement of the holograms and instantaneous illumination thereof is accomplished fast enough so that an observer looking at the successive two-dimensional images formed on the diffusion screen 31 appears to see continuous motion of his simulated airplane approaching an airport.

The motion of the film strip 67 may be continuous and the pulsation of the reconstructing light beam 23 occurring automatically each time a new hologram is drawn in front of the aperture 71. The pulse may be made for such a short duration that the film strip 67 appears to be stopped while illuminated. Simulated motion of the airplane a distance away from the predetermined glide path is accomplished by moving the reconstructing light beam 23 relative to the mask 69. The airplane will appear to approach closer to or go away from the predetermined glide path if, between successive pulses of the reconstructing light beam 23, the beam 23 is moved to a new position within the aperture 71. As the reconstructing light beam is scanned relative to the mask 69, so must the projection lens 29 be scanned to remain at all times within the diffracted image-carrying light beam 27.

There are many mechanisms which will become apparent for carrying out the reconstructing methods illustrated in FIG. 5. The mask 69 is really unnecessary, since a mere spatial definition of the aperture 71 is all that is necessary. Furthermore, the reconstructing light beam 23 need be made to scan only the width of the film strip 67. Its movement along the length of the film strip 67 may be effectively accomplished by varying the timing of the reconstructing light beam pulses relative to the speed at which the film strip 67 is drawn therethrough.

In an aircraft simulator, two variables may, therefore, be easily controlled. The simulated speed of the aircraft down the glide path is determined by the speed of movement of the film strip 67 and thus by the frequency of the occurrence of the individual reconstructed images. Secondly, the simulated position of the airplane relative to the predetermined glide path is determined by altering the area 21 of each hologram that is illuminated with the narrow reconstructing beam 23.

Figure 6:
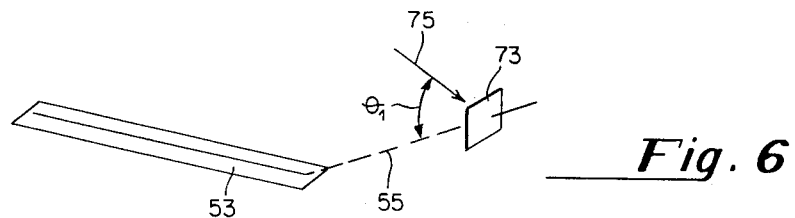
FIGS. 6 and 6A show a modification of the hologram construction technique of FIG. 4.
Figure 6A:
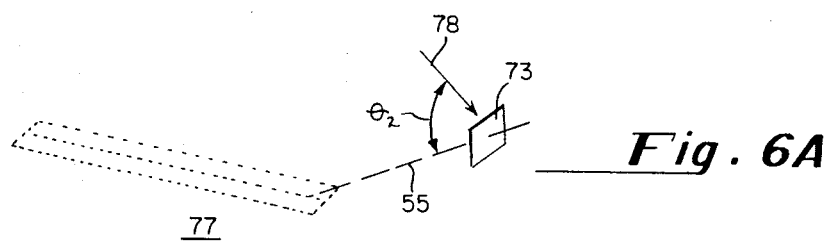

Each of the holograms shown constructed in FIG. 4 may also include images of weather conditions such as clouds, runway lights and other variable conditions. However, it appears preferable to record information of such variable conditions in a manner that they may be optionally added to the runway scene reconstructed when desired. This allows a variation of the airplane approach conditions being simulated. The holographic technique known as hologram "stacking" may be used for this purpose. Referring to FIG. 6, a hologram is constructed on a thick photosensitive medium in a hologram aperture 73 on the glide path 55 to the runway model 53. Hereinabove, we did not specify the angle that the reference radiation made with the hologram detector during construction of those holograms. Herein, however, a reference beam 75 is caused to strike the plane of the hologram aperture 73 at an angle $\theta_1$ with a normal thereto. During image reconstruction, the reconstructing beam preferably maintains substantially the same angle $\theta_1$ with the hologram. Referring to FIG. 6A, a second exposure of the same hologram detector located within the hologram aperture 73 is made of a scaled replica of the runway lights 77. For this exposure, a second reference beam 78 is utilized but is caused to intersect the plane of the hologram aperture 73 at an angle $\theta_2$ with a normal thereto. Therefore, the single hologram formed by the double exposure contains two holograms which may be reconstructed either one at a time or simultaneously with superimposition of the two images. Other variables may also be added by further hologram exposures on the same holographic detector.

Figure 7:
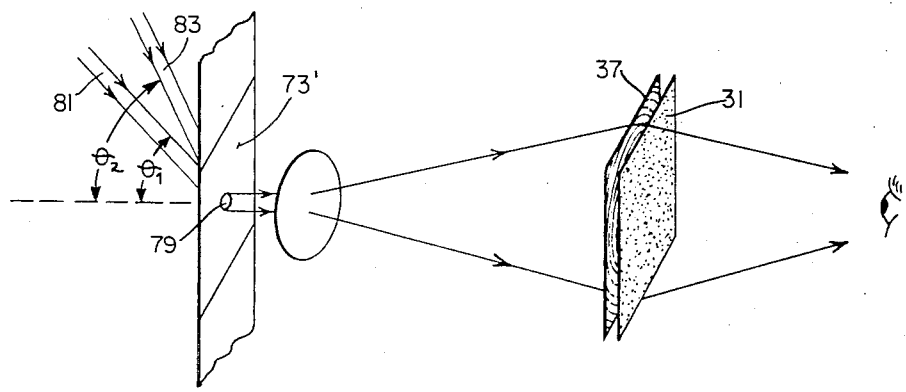
FIG. 7 shows a technique for reconstructing a hologram constructed according to FIGS. 6 and 6A.

Referring to FIG. 7, the reconstruction of a hologram 73' constructed according to the techniques of FIGS. 6 and 6A is shown. A small area 79 is illuminated with a reconstructing beam 81 for reconstructing therefrom an image of the runway and also by a reconstructing beam 83 for reconstructing an image of the runway lights superimposed thereover. If the runway lights are not desired, the reconstructing beam 83 is simply not utilized. Both reconstructing beams 81 and 83 when moved relative to the hologram 73' maintain a constant angle therewith.

In the embodiments of the present invention described so far, a single image is reconstructed and displayed in two dimensions on a diffusion screen. In certain applications wherein an image is displayed on a two-dimensional screen, it may be desired to reconstruct two images in a manner to provide stereoscopic viewing. A hologram 11' as constructed by ordinary techniques contains enough information of an object so that two images may be reconstructed therefrom to give a stereoscopic viewing effect. Two specific techniques are described with respect to FIGS. 8 and 9. In both of these stereoscopic projection systems, the hologram 11' is illuminated with two small reconstructing light beams which remain parallel with each other and at a constant angle with respect to the hologram 11'. The two beams are separated a distance so that they intersect the hologram 11' at two locations separated an amount equal to normal human eye separation. If the hologram 11' is made of a scaled replica of an object scene to be projected in full size, the two areas reconstructed of the hologram 11' are separated a distance equal to normal eye separation divided by the model scaling factor.

Figure 8:
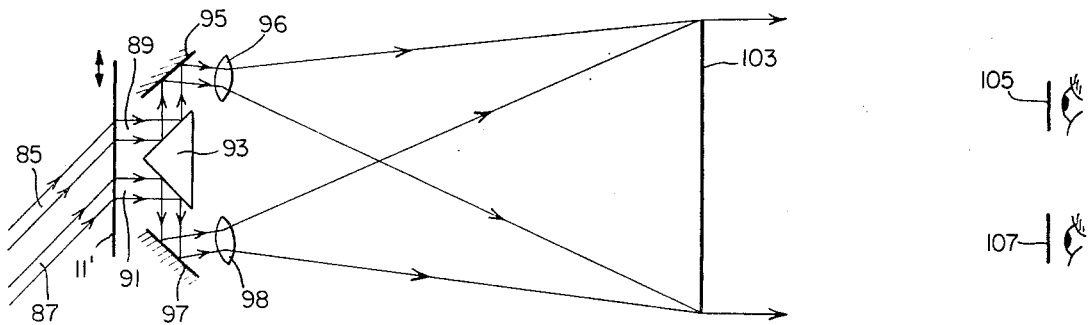
FIG. 8 shows one form of a stereoscopic image reconstruction of the present invention wherein polarized light is utilized.

Referring to FIG. 8, a specific stereoscopic projection technique is described in more detail. A reconstructing beam 85 illuminates one area of the hologram 11' and a second reconstructing light beam 87 illuminates a second area of the hologram 11'. These two areas are shown to be separated a normal eye separation distance divided by a model scaling factor. These two areas of the hologram diffract a portion of the light intensity of the two reconstructing beams into a diffracted beam 89 and a second diffracted beam 91. These beams are changes in direction 90° by a mirror element 93 and then strike fixed mirrors 95 and 97, respectively. The mirror 95 and 97 direct the diffracted image-carrying beams through individual lenses 96 and 98, respectively. The lenses 96 and 98 modify the diffracted image-carrying beams to form sharp images on a diffusion screen 103.

In order to provide for the image-carrying beam 99 to be viewed by one eye and not the other and, conversely, for the beam 101 to be viewed by the other eye and not the first, the reconstructing beams 85 and 87 are polarized 90° apart from each other. The viewer than wears polarized glasses with a lens 105 matched with the polarization of the reconstructing beam 85 and a lens 107 matched with the polarization of the reconstructing beam 87.

Figure 9:
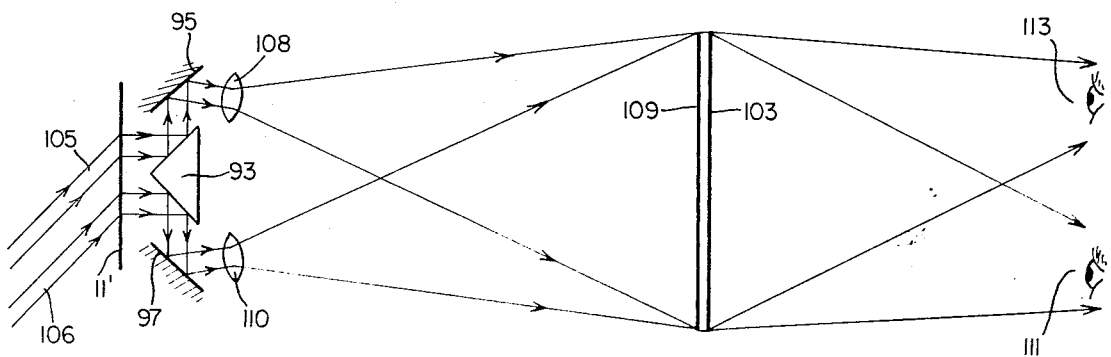
FIG. 9 illustrates another stereoscopic image reconstruction embodiment according to the present invention wherein separate exit pupils are provided.

Referring to FIG. 9, an alternative technique of reconstructing the hologram 11' in a stereoscopic manner is shown. Two identical reconstructing light beams 105 and 106 illuminate the hologram 11' to form diffracted image-carrying beams which are reflected by an element 93 onto mirrors 95 and 97 that are separated from each other a distance equal to normal eye separation. A large lens 109, most conveniently a Fresnel-type lens, is positioned adjacent to the diffusion screen 103 and is designed to direct light reflected from the mirror 95 into an exit pupil 111. Similarly, the lens 109 is designed to simultaneously direct the light reflected from the mirror 97 into a separate exit pupil 113. Two images are then formed on the diffusion screen 103 but one is viewable only in the exit pupil 111 and the other is viewable only in the exit pupil 113. The lens 108 and 110 transfer the virtual images reconstructed from the hologram into real image space and focused on the diffusion screen 103. The exit pupils 111 and 113 are separated in amount equal to human eye separation and each made a little larger than a single human eye to give some flexibility in where a viewer may position himself with respect to the diffusion screen 103 in order to obtain the stereoscopic effect. It may be noticed that the limitation on viewer position in the stereoscopic projection system of FIG. 9 does not exist in the stereoscopic projection system of FIG. 8 wherein polarized glasses are utilized to separate the two images.

It shall be understood the invention is not limited to the specific arrangements shown, and that changes and modifications may be made within the scope of the appended claims.

What is claimed is:

1. In the art of holography wherein a Fresnel hologram is constructed by interfering at a finite angle object-modified and reference radiation beams, a method of projecting at least one image of the object onto a diffusion screen for viewing by an observer, comprising the steps of:

providing relative motion between the hologram and at least one narrow beam of reconstructing radiation having a cross-sectional area significantly less than the area of said hologram and maintaining a uniform angular relationship therewith, whereby a portion of the intensity of said at least one radiation beam is diffracted by the hologram into at least one object-image-carrying beam, positioning the diffusion screen in said at least one diffracted object-image-carrying beam, projecting said at least one diffracted object-image-carrying beam to form at least one object image in real space coincident with the diffusion screen, and directing said object-image-carrying beam into an exit pupil of limited extent slightly larger in cross section than the observer's eyes, thereby to conserve reconstructing radiation power.

2. The method according to claim 1 wherein the step of providing relative motion between the hologram and at least one narrow beam of reconstructing radiation includes providing relative motion between the hologram and exactly two parallel narrow beams of reconstructing radiation, the two narrow beams of reconstructing radiation being individually polarized in directions displaced 90° from each other, whereby a portion of the intensity of the two reconstructing radiation beams is diffracted by the hologram into two object-image-carrying beams.

3. The method according to claim 1 wherein the step of providing relative motion between the hologram and at least one narrow beam of reconstructing radiation includes providing relative motion between the hologram and exactly two parallel narrow beams of reconstructing radiation, whereby a portion of the intensity of the two reconstructing radiation beams is diffracted by the hologram into two object-image-carrying beams, each of the two diffracted object-image-carrying beams being directed into spatially separate exit pupils by an imaging lens position near the diffusion screen.

4. A method of simulating controlled motion relative to a surroundings for viewing by an observer, comprising the steps of:

constructing a plurality of holograms of said surroundings along a predetermined path therethrough, illuminating each hologram in predetermined sequence by at least one narrow reconstructing radiation beam having a cross-sectional area significantly less than the area of the hologram, said illumination additionally being accomplished in a manner that images are successively reconstructed therefrom in substantially the same real space, positioning a diffusion screen in said reconstructed image real space to provide two dimensional images thereon, positioning a light-collecting lens relative to the diffusion screen to provide an exit pupil of limited extent slightly larger in cross section than the observer's eyes, controlling the rate at which the successive holograms are reconstructed, thereby to control the simulated speed of motion through said surroundings, and controlling the location of each successive hologram that is illuminated by said at least one narrow reconstructing radiation beam, thereby to simulate a controlled lateral position within the surroundings relative to said predetermined path.

5. The method according to claim 4 wherein said plurality of holograms are formed on a film strip which is drawn during reconstruction through a reconstructing beam path, and wherein the reconstructing beam is pulsed once for each hologram that is positioned in said beam path.

6. The method according to claim 4 wherein the construction of each of said plurality of holograms includes recording thereon an image modification of said surroundings that may be reconstructed independently of said surroundings alone, and wherein the step of illuminating each hologram includes illumination thereof with a second narrow reconstructing radiation beam in a manner to reconstruct an image of said modification of said surroundings.

7. In a holography system wherein a Fresnel hologram is constructed by interfering at a finite angle object-modified and reference radiation beams, apparatus for projecting at least one image of an object onto a diffusion screen for viewing by an observer comprising, means for providing relative motion between the hologram and at least one narrow beam of reconstructing radiation having a cross-sectional area significantly less that the area of said hologram and for maintaining a uniform angular relationship therewith, whereby a portion of the intensity of said at least one radiation beam is diffracted by the hologram into at least one object-image-carrying beam, a diffusion screen positioned in said at least one diffracted object-image-carrying beam, means for projecting said at least one diffracted object-image-carrying beam to form at least on object image in real space coincident with said diffusion screen, and means for directing said image beam into an exit pupil of limited extent slightly larger in cross section than the observer's eyes thereby to conserve reconstructing radiation power.

8. Apparatus according to claim 7 wherein said diffusion screen has the characteristic of scattering light over only a narrow range of angles corresponding to said limited extent of said exit pupil.

9. Apparatus according to claim 7 wherein said directing means comprises a light-collecting lens which limits the extent of said exit pupil.

* * * * *